(12) United States Patent
Ogishima et al.

(10) Patent No.: US 11,318,976 B2
(45) Date of Patent: May 3, 2022

(54) CART STORAGE SYSTEM AND POWER FEED SYSTEM

(71) Applicant: TOSHIBA TEC KABUSHIKI KAISHA, Tokyo (JP)

(72) Inventors: Takuya Ogishima, Izu Shizuoka (JP); Masakazu Kato, Numazu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 146 days.

(21) Appl. No.: 16/740,849

(22) Filed: Jan. 13, 2020

(65) Prior Publication Data
US 2020/0298898 A1   Sep. 24, 2020

(30) Foreign Application Priority Data
Mar. 22, 2019   (JP) .............................. JP2019-054197

(51) Int. Cl.
| | |
|---|---|
| *H02J 50/90* | (2016.01) |
| *B62B 3/14* | (2006.01) |
| *H02J 50/10* | (2016.01) |
| *H02J 50/40* | (2016.01) |
| *B62B 5/04* | (2006.01) |

(52) U.S. Cl.
CPC .......... *B62B 3/1404* (2013.01); *B62B 3/1492* (2013.01); *B62B 5/04* (2013.01); *H02J 50/10* (2016.02); *H02J 50/40* (2016.02); *H02J 50/90* (2016.02)

(58) Field of Classification Search
CPC ....... B62B 3/1404; B62B 3/1492; B62B 5/04; H02J 50/90; H02J 50/10; H02J 50/40
See application file for complete search history.

(56) References Cited

U.S. PATENT DOCUMENTS

| | | | |
|---|---|---|---|
| 9,586,562 B1 * | 3/2017 | Noonan | .................... B60T 3/00 |
| 2003/0027644 A1 * | 2/2003 | Soderberg | .............. A63C 19/10 |
| | | | 472/90 |
| 2003/0213072 A1 * | 11/2003 | Myrick | .................. A01K 1/035 |
| | | | 14/69.5 |

(Continued)

FOREIGN PATENT DOCUMENTS

| | | | |
|---|---|---|---|
| JP | 2006-217690 A | | 8/2006 |
| JP | 2006217690 A | * | 8/2006 |

(Continued)

OTHER PUBLICATIONS

Extended European Search Report dated May 4, 2020 in corresponding European Patent Application No. 20159029.6, 7 pages.

*Primary Examiner* — James A Shriver, II
*Assistant Examiner* — Michael T. Walsh
(74) *Attorney, Agent, or Firm* — Kim & Stewart LLP

(57) ABSTRACT

A cart storage system for storing a movable cart includes a storage plate inclined with respect to a floor in a first direction crossing a moving direction of a cart, a stopper along a back side of the storage plate in the moving direction, and a first holding plate extending along the moving direction, configured to stop movement of the cart in the lateral direction, and disposed a first predetermined distance away from a lateral side of the storage plate.

20 Claims, 4 Drawing Sheets

(56) References Cited

U.S. PATENT DOCUMENTS

| | | | |
|---|---|---|---|
| 2006/0191858 A1* | 8/2006 | Posner | A47F 10/04 211/20 |
| 2008/0210268 A1* | 9/2008 | Metheny | A47F 10/04 134/95.2 |
| 2009/0058357 A1* | 3/2009 | Saker | H01R 25/14 320/107 |
| 2010/0096344 A1* | 4/2010 | Vanderhoek | A47F 7/0078 211/49.1 |
| 2013/0133143 A1* | 5/2013 | Purdon | B65G 69/30 14/69.5 |
| 2013/0335023 A1* | 12/2013 | Radin | B60L 53/14 320/109 |
| 2014/0224752 A1* | 8/2014 | Lynch | A47F 1/126 211/59.3 |
| 2017/0112053 A1* | 4/2017 | Babkin | A01D 34/866 |
| 2017/0326996 A1 | 11/2017 | Kotani et al. | |

FOREIGN PATENT DOCUMENTS

| | | | |
|---|---|---|---|
| JP | 2008-117102 A | | 5/2008 |
| JP | 2008117102 A | * | 5/2008 |
| JP | 2018-136910 A | | 8/2018 |

* cited by examiner

CART STORAGE SYSTEM AND POWER FEED SYSTEM

CROSS-REFERENCE TO RELATED APPLICATION

This application is based upon and claims the benefit of priority from Japanese Patent Application No. 2019-054197, filed on Mar. 22, 2019, the entire contents of which are incorporated herein by reference.

FIELD

Embodiments described herein relate generally to a cart storage system and a power feed system.

BACKGROUND

In recent years, non-contact charging is used in an electronic device such as a smartphone. In non-contact charging, power is transmitted by electromagnetic coupling between a power feeding coil provided in a power feeding device and a power receiving coil provided in an electronic device. In the electronic device, a battery is charged with power received by the power receiving coil. In such non-contact charging, highly efficient charging can be performed when a coupling coefficient between the power feeding coil and the power receiving coil is increased in a state where the coils face each other. For that reason, in order to perform efficient charging, it is important to align positions of the power feeding coil and the power receiving coil.

In the related art, an automatic guided vehicle is known, which runs along a preset path and stops at a stop position on the preset path to perform non-contact charging. However, for a movable cart such as a shopping cart that is chargeable by non-contact charging, neither a path nor a stop position is set in advance. Thus, an operator needs to manually align the position of the power receiving coil installed in the cart and the position of the power feeding coil installed on the floor. However, it is difficult for the operator to precisely align the positions. For example, a shopping cart may be used by a customer who is not used to operating non-contact charging devices. For that reason, it is not easy to require all operators to align the power receiving coil provided in the cart and the power feeding coil provided at a predetermined position.

DETAILED DESCRIPTION

Embodiments provide a cart storage system and a power feed system that can easily store a cart at a predetermined position.

In general, according to an embodiment, a cart storage system for storing a movable cart includes a storage plate inclined with respect to a floor in a lateral direction crossing a moving direction of a cart, a stopper along a back side of the storage plate in the moving direction, and a first holding plate extending along the moving direction, configured to stop movement of the cart in the lateral direction, and disposed a first predetermined distance away from a lateral side of the storage plate.

Hereinafter, embodiments will be described with reference to the drawings.

First, a configuration of a cart used in a cart storage system according to one embodiment will be described.

Figure 1:
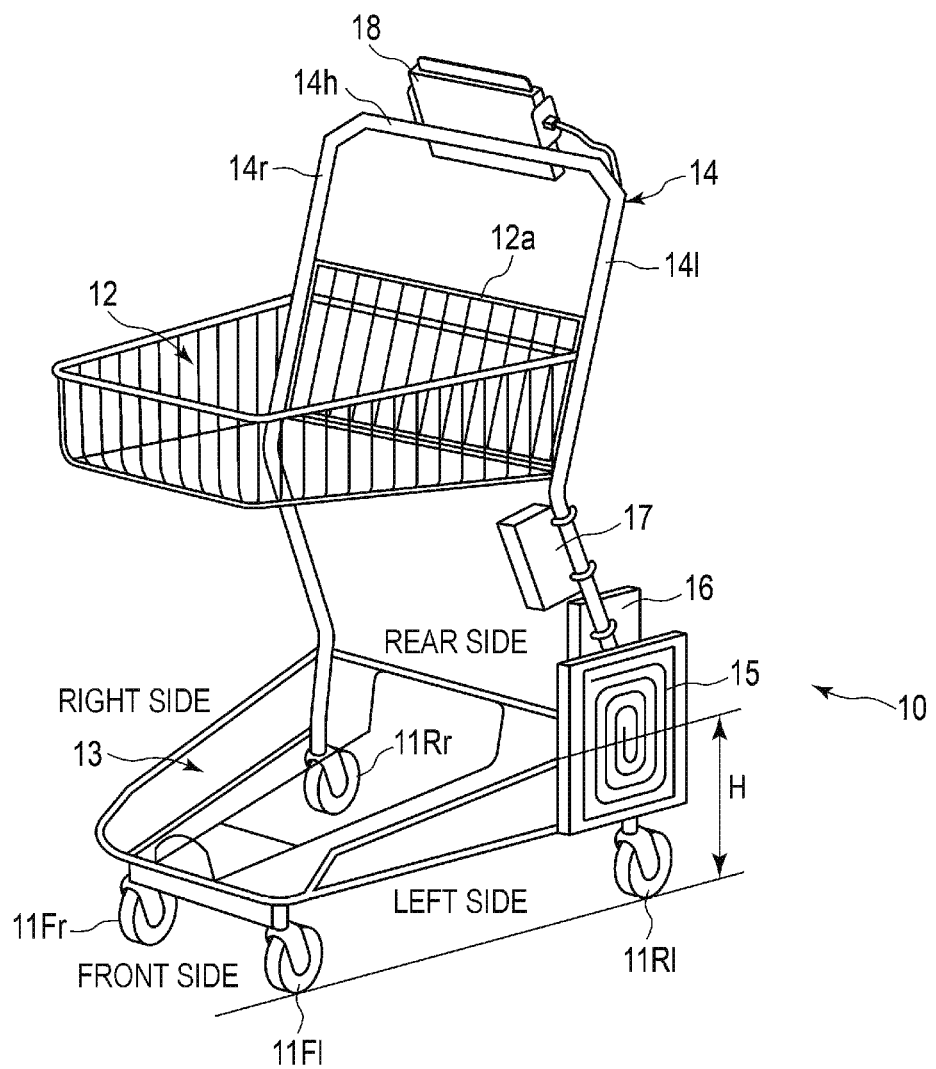
FIG. 1 illustrates a configuration of a cart according to one embodiment.

FIG. 1 is a diagram illustrating a configuration of a cart 10 used in the cart storage system according to the embodiment.

The cart 10 illustrated in FIG. 1 is, for example, a shopping cart. The cart 10 is a movable object in which an item such as a commodity to be purchased by a customer is stored. In the configuration example illustrated in FIG. 1, the cart 10 has a cart body including wheels 11 (11Fr, 11Fl, 11Rr, 11Rl), a basket 12, a basket mounting portion 13, a frame 14, and the like.

In the cart 10, a power receiving coil 15, a power receiving circuit 16, a secondary battery 17, and an electronic device 18 are mounted on the cart body. The electronic device 18 is a device for providing information and providing services to a user. The secondary battery 17 is a power supply device for operating the electronic device 18. The power receiving coil 15 and the power receiving circuit 16 make up a power receiver 19. The secondary battery 17 is charged with power received by the power receiver 19.

The wheels 11 include a right front wheel 11Fr, a left front wheel 11Fl, a right rear wheel 11Rr, and a left rear wheel 11Rl. The frame 14 integrally fixes the wheels 11, the basket 12, and the basket mounting portion 13 on the rear wheels 11Rr and 11Rl side. The frame 14 includes a right support 14$r$, a left support 14$l$, and a handle 14$h$. The support 14$r$ is a part of the frame 14 that extends upward from the vicinity of the right rear wheel 11Rr. The support 14$l$ is a part of the frame 14 that extends upward from the vicinity of the left rear wheel 11Rl. The handle 14$h$ is a part of the frame 14 held by an operator who moves the cart body. In the configuration example illustrated in FIG. 1, the handle 14$h$ is provided so as to be parallel to a surface (for example, a floor surface) on which the cart runs.

A shape of the frame 14 is not limited to the shape illustrated in FIG. 1. The frame 14 may have any shape that can hold the power receiving coil 15, the power receiving circuit 16, the secondary battery 17, the electronic device 18, and the like. The frame 14 is formed such that a plurality of carts 10 can be aligned and stored in a nested shape in a compact manner. The handle 14$h$, the support 14$r$, the support 14$l$, and the like may have a shape different from the shape illustrated in FIG. 1. For example, the handle 14$h$ may have a shape protruding from the support 14$l$ side to the operator side of the cart 10.

The basket 12 stores an article such as a commodity. In the embodiment, as illustrated in FIG. 1, the handle 14$h$ side with respect to the basket 12 is referred to as a front-side, and the opposite side is referred to as a tip-side. The basket 12 has an opening and closing surface 12$a$ whose front-side surface can be opened and closed with the lower end of the surface 12$a$ as a free end. The basket 12 is formed such that the tip-side surface (i.e., the front surface) is smaller than the front-side surface (i.e., the rear surface) as the opening and closing surface 12$a$. With this configuration, when a rear cart is pushed into a front cart, the tip-side surface of the rear cart pushes up the opening and closing surface 12$a$ of the front cart so that the baskets 12 of the front and rear carts are stored so as to overlap each other. Thus, the plurality of carts is stored in a nested shape in a row. The carts are manufactured to have substantially the same shape. For that reason, the plurality of carts 10 stored in a nested shape in a row is arranged at substantially equal intervals.

The four wheels 11 are attached to the frame 14 via casters, respectively. Four casters to which the wheels 11 are attached are provided at four corners of the lower portion of the frame 14. Each wheel 11 is freely rotated in a rotation direction by each caster. With this configuration, the cart body can freely change the moving direction. The cart 10 moves as the wheels 11 attached to the casters rotate on the floor surface.

The lower portion of the frame 14 at which the four wheels 11 are provided at the four corners forms the basket mounting portion 13. The lower portion of the frame 14 that functions as the basket mounting portion 13 is formed such that the front side of the lower portion is narrower and the rear thereof is wider in an advance direction. For that reason, an interval between the right front wheel 11Fr and the left front wheel F$l$ is narrower than an interval between the right rear wheel 11Rr and the left rear wheel R$l$. With this configuration, when the plurality of carts is stored in a row in front and back, the frames of the rear carts are stored so as to overlap along the frame of the front cart.

On the left support 14$l$, the power receiving coil 15, the power receiving circuit 16, and the secondary battery 17 are provided between the basket 12 and the basket mounting portion 13.

The power receiving coil 15 and the power receiving circuit 16 make up the power receiver 19 that receives power from a power feeder. The power receiving coil 15 generates AC power from magnetic flux φ generated when a current flows through the power feeding coil 5. The power receiving coil 15 has a power receiving surface disposed at a height H substantially perpendicular to the floor surface on the lower side surface of the support 14$l$ so as to face the power feeding coil 5. By adopting a configuration in which the power receiving surface of the power receiving coil and a power feeding surface of the power feeding coil are set up vertically, obstacles such as metal can be prevented from being disposed between the power receiving surface and the power feeding surface. As a result, it is possible to prevent occurrence of problems such as heat generation due to obstacles such as metal between the power receiving surface and the power feeding surface.

In the embodiment, although the flat power receiving coil 15 is attached to the lower portion of the left support 14$l$ of the cart 10, it is not limited thereto. For example, a position of the power receiving coil 15 is not limited to the lower portion of a side surface of the cart 10 as illustrated in FIG. 1, but the power receiving coil 15 may be attached to the upper portion of the side surface of the cart 10 or the like. Here, a surface that receives the magnetic flux φ generated by a power feeding coil (for example, a power feeding coil 35 (see FIG. 2) of the power feed system described later) is defined as the power receiving surface. By configuring the power receiving surface of the power receiving coil 15 to face the outside of the cart 10, the power receiving surface and the power feeding surface of the power feeding coil are installed to face each other. The power receiving coil 15 is attached such that the power receiving surface faces the power feeding surface of the power feeding coil at the same height in a state where the cart is stored in a storage position of a cart storage system described later.

The power receiving circuit 16 includes the power receiving circuit, the power receiving control circuit, and the like. The power receiving circuit 16 is connected to the power receiving coil 15. The power receiving circuit 16 is provided in the vicinity of the power receiving coil 15, for example.

The power receiving circuit 16 includes a circuit that rectifies and smooths AC power received by the power receiving coil 15 to generate DC. The power receiving circuit 16 includes a charging circuit that converts DC power generated from the received power into power suitable for charging the secondary battery 17 and supplies the converted power to the secondary battery 17. Furthermore, the power receiving circuit 16 includes a circuit for controlling on and off of non-contact power feeding. The power receiving circuit 16 may include a control circuit such as a circuit for controlling power to be supplied by communication with the power feeder side. The power receiving circuit 16 is configured by, for example, storing various circuits described above in a circuit box. In the configuration example illustrated in FIG. 1, the power receiving circuit 16 is provided on the side opposite to the side where the power receiving coil 15 is disposed with the support 14$l$ interposed therebetween.

In the left support 14$l$, the secondary battery 17 is attached above the power receiving coil 15 and the power receiving circuit 16. The secondary battery 17 is charged with power generated by the charging circuit of the power receiving circuit 16. The secondary battery 17 is connected to the electronic device 18. The secondary battery 17 supplies power to the electronic device 18. The secondary battery 17 may be any battery as long as it is mounted on the cart in a state of being connected to the power receiving circuit 16 and the electronic device 18. For example, the secondary battery 17 may be attached to any portion of the cart 10 other than the support 14$l$ or may be integrated into a battery of the electronic device 18.

The electronic device 18 is attached to the cart 10. In the configuration example illustrated in FIG. 1, the electronic device 18 is attached to the handle 14$h$. The electronic device 18 is driven by power from the secondary battery 17. For example, the electronic device 18 is an information terminal such as a tablet terminal for providing information to the user, or a commodity reader that acquires information on a commodity selected by the user. The electronic device 18 may be a charging device or the like for charging an electronic device of a portable terminal (for example, a portable phone, a smartphone, a digital camera, and the like) possessed by the user with power from the secondary battery 17.

For example, when the electronic device 18 is the tablet terminal equipped with the commodity reader, the tablet terminal is installed with a display unit facing the user who grips the handle 14$h$. The tablet terminal as the electronic device 18 is a computer which includes the display unit provided with a touch panel. The commodity reader as the electronic device 18 is a device that reads commodity information. For example, the commodity reader is an RFID tag reader that reads an RFID tag or the like attached to a commodity to be taken in and out of the basket 12. The commodity reader may be a scanner that reads commodity identification information such as a barcode attached to the commodity. The tablet terminal displays commodity information read by the commodity reader. The tablet terminal may perform registration and settlement processing for the commodity read by the commodity reader. The electronic device 18 may be a device provided with an interface device for connecting a portable terminal (for example, a smartphone) possessed by the user instead of the tablet terminal described above.

As described above, in the configuration example illustrated in FIG. 1, the power receiving circuit 16 and the secondary battery 17 are disposed around the left support 14$l$ between the basket 12 and the basket mounting portion 13. With this configuration, the cart operator can operate the movement of the cart 10 with the handle 14 to be gripped while confirming commodity information and store information obtained from the electronic device 18.

Figure 2:
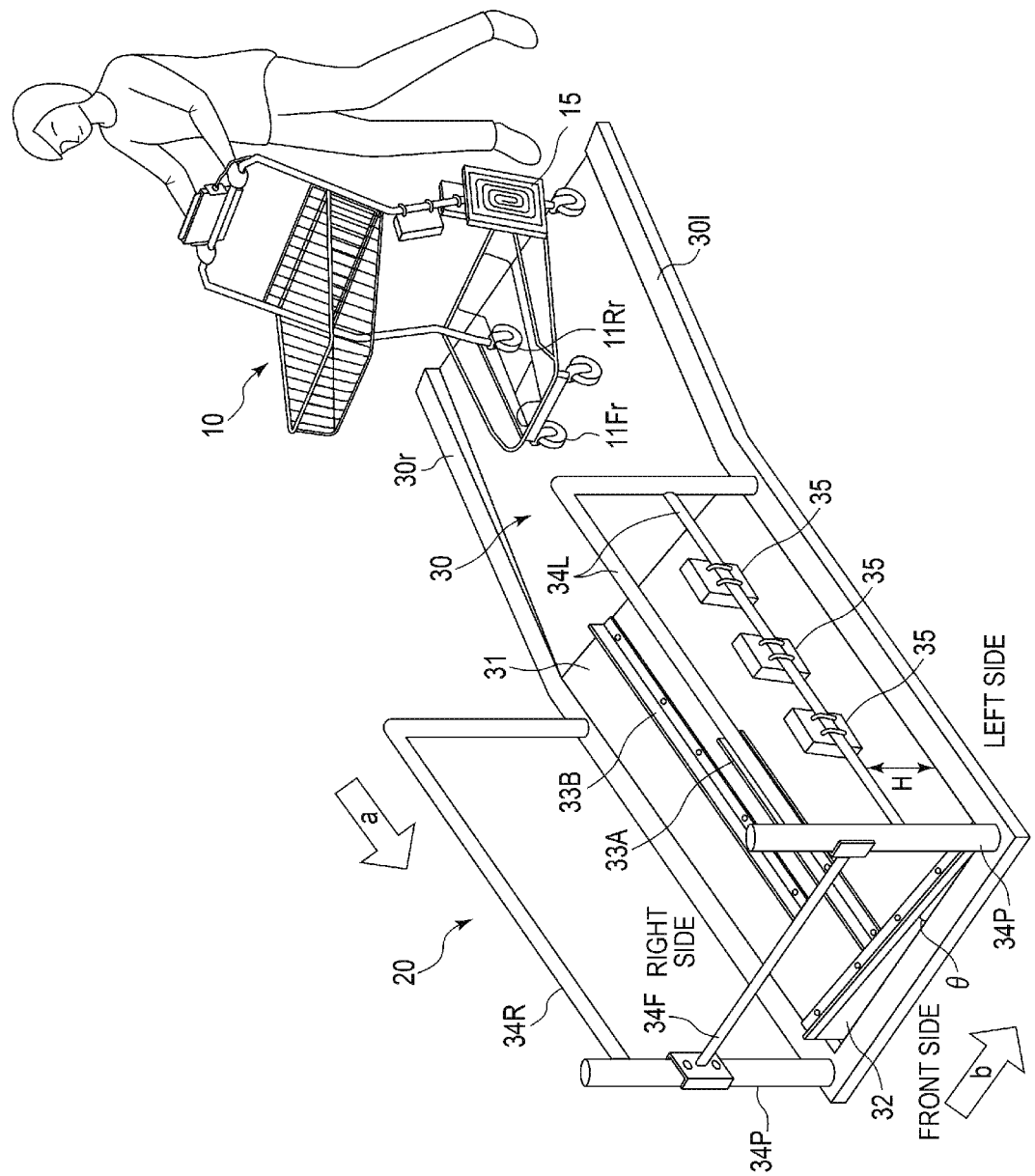
FIG. 2 illustrates an overall configuration of a cart storage system according to the embodiment.

Next, FIG. 2 is a diagram illustrating a configuration of a power feed system 20 as the cart storage system according to the embodiment.

The power feed system 20 functions as a cart storage system that determines the storage position for storing the cart 10 such as a shopping cart. The power feed system 20 includes a running plate 30 that forms a running surface on which the cart 10 runs and a storage plate 31 that is a cart storage place.

The running plate 30 forms a running path for guiding the cart 10 onto the storage plate 31. Since the top surface of the storage plate 31 is the storage position of the cart, the running plate 30 serves as an entrance and exit of the cart 10 to the storage position. The running plate 30 is installed with an upward inclination from the floor surface toward the storage plate 31 according to the height from the floor surface of the storage plate 31 described later. The running plate 30 includes outer frames 30r and 30l for preventing the wheels 11 of the cart 10 from being run off along the running path of the cart.

The storage plate 31 is a storage position for storing a plurality of carts 10 in a state of being in a nested shape in a row. The storage plate 31 is installed in a state where a gradient θ is provided such that the left side (i.e., the side on which the power feeding coil is provided) is inclined downward from a connection portion with the running plate 30 toward the front (i.e., entering direction a). That is, the storage plate 31 is installed to be inclined to the left with respect to the entering direction a so that an angle with respect to the floor surface is the gradient θ.

Here, the gradient θ will be described. In the embodiment, the floor surface is a horizontal plane with respect to a gravity direction. When the storage plate 31 is inclined with respect to the floor surface, the force that moves the cart 10 in a direction orthogonal to the entering direction a (i.e., inclination direction b) is applied to the cart 10 on the storage plate 31. When the storage plate 31 is inclined at the gradient θ with respect to the floor surface, the cart 10 is moved or easily moved in the inclination direction b of the storage plate 31 by its own weight.

That is, in order to move the cart 10 or to perform assist movement of the cart 10 on the storage plate 31 in the inclination direction b, the storage plate 31 has the gradient θ with respect to the floor surface in a direction orthogonal to the entering direction a. For example, the gradient θ is an angle at which the cart 10 starts to move in the inclination direction b by its own weight when the storage plate 31 is gradually inclined with the cart 10 placed. However, the gradient θ may be an angle at which the wheels 11 of the cart 10 are easily guided to the holding plate 33. For example, the gradient θ may be an angle of 5 to 10 degrees with the floor surface.

The storage plate 31 is provided with a stopper 32 at the foremost portion in the entering direction a to the storage position of the cart 10. The stopper 32 stops the front wheels 11Fr and 11Fl of the first cart 10, which moves on the storage plate 31 along the entering direction a, at a predetermined stop position. The stopper 32 may be any stopper as long as it stops the front wheels 11Fr and 11Fl of the first cart, and has an L-shape, for example. With this configuration, since the front wheels 11 of the cart 10 stop at the position where the stopper 32 is installed, the cart moving in the entering direction a on the storage plate 31 can be stopped.

Furthermore, the storage plate 31 is provided with a holding plate 33 that restricts the movement of the cart 10 in the inclination direction b. The holding plate 33 holds the wheels 11 of the cart 10 moving on the storage plate 31 in the inclination direction b due to the gradient θ. The holding plate 33 includes a front wheel holding plate 33A that holds the front wheel of the cart 10 and a rear wheel holding plate 33B that holds the rear wheel of the cart 10.

The front wheel holding plate 33A is provided to hold the position of the front wheel along the entering direction a of the cart 10. The rear wheel holding plate 33B is provided to hold the position of the rear wheel along the entering direction a of the cart 10. The front wheel holding plate 33A and the rear wheel holding plate 33B stop the front wheel and the rear wheel, that move in a direction orthogonal to the entering direction a due to the gradient θ of the holding plate 33, at a predetermined position and hold the cart 10 in a state of being suspended in the inclination direction b. The front wheel holding plate 33A and the rear wheel holding plate 33B have an L-shape, for example.

When a plurality of carts 10 is stored in a nested shape in a row, the power feeding coil 35 and the power receiving coil 15 of the cart 10 described later need to maintain a predetermined interval and maintain a parallel positional relationship.

In order to accurately align the power feeding coil 35 and the power receiving coil 15 by holding the plurality of wheels 11 of each cart 10, at least two holding plates 33 are provided. In the configuration example illustrated in FIG. 2, the right front wheel 11Fr and the right rear wheel 11Rr are held at predetermined positions in the inclination direction b by the front wheel holding plate 33A and the rear wheel holding plate 33B, respectively, and the cart 10 is suspended.

However, the holding plate 33 may be any holding plate as long as it holds two or more wheels among the four wheels of the cart 10. For example, the holding plate 33 may be configured by a first holding plate that holds the front wheel 11Fr on the right side of the cart 10 (e.g., the front wheel holding plate 33A) and a second holding plate that holds the rear wheel 11Rl on the left side of the cart 10. The holding plate 33 may be configured by a first holding plate that holds the rear wheel 11Rr on the right side of the cart 10 (e.g., the rear wheel holding plate 33B) and a second holding plate that holds the front wheel 11Fl on the left side of the cart 10.

The storage frame 34 is formed so as to surround the storage plate 31 including the stopper 32 and the holding plate 33. The storage frame 34 includes a support frame 34P provided on the front side of the storage plate 31, a front frame 34F, a right surface frame 34R, a left surface frame 34L, and the like. The left surface frame 34L includes an upper frame and a lower frame. The lower frame of the left surface frame 34L is provided between the upper frame and the storage plate 31, and a plurality of power feeding coils 35 that are flat at equal intervals are attached to the lower frame of the left frame 34L according to the number of the power receiving coils 15 provided in the cart 10.

In the example illustrated in FIG. 2, three power feeding coils 35 are attached to the lower frame of the left surface frame 34L at equal intervals. The intervals between the power feeding coils 35 are set based on front-and-rear intervals of the carts stored in the storage positions in a nested shape in a row. When the height of the power receiving coil 15 provided on the cart 10 from a ground surface is H, the power feeding coil 35 is attached to the left surface frame 34L toward the power receiving coil so that the height of the power feeding coil 35 is H.

Each power feeding coil 35 is provided with the power feeding controller. The power feeding controller includes the power feeding circuit, the control circuit, and the like. The power feeding controller is formed integrally with the power feeding coil 35 and attached to the frame 34L, for example. The power feeding controller may have a separate casing from the power feeding coil 35 and be disposed on the floor surface or the like by being connected to the power feeding coil 35 via a cable. The power feeding controller is connected to a power source such as an AC commercial power supply in order to supply power to the power feeding circuit and a power feeding control part. The power feeding coil 35 transmits power to the power receiving surface of the power receiving coil 15 of the cart 10 by the magnetic flux φ generated on the power feeding surface by the AC power supplied from the power feeding circuit of the power feeding controller.

The power feeding controller of each power feeding coil 35 may be controlled independently. In this case, each power feeding coil 35 can independently supply high-frequency AC power. For example, if only one cart is stored, the power feed system 20 can supply AC power from the power feeding coil 35 at the head of the entering direction a among a plurality of power feeding coils, and can turn off power supply from the other power feeding coils 35.

On the lower frame of the left surface frame 34L, an attachment angle of the power feeding coil 35 can be adjusted. On the lower frame of the left frame 34L, for example, the power feeding surface of the power feeding coil 35 is provided at an angle of $(90-\theta)°$ with respect to a plane perpendicular to the floor surface. With this configuration, the power feeding surface of the power feeding coil 35 can be adjusted to be parallel to the power receiving surface of the power receiving coil 15 of the cart 10 on the storage plate 31 installed to be inclined by the gradient θ with respect to the floor surface.

In the cart storage system illustrated in FIG. 2, three power feeding coils 35 are attached side by side and three carts to be charged by the three power feeding coils 35 are stored. These three power feeding coils 35 are provided at equal intervals so that the power feeding surfaces of the power feeding coils 35 face the power receiving surfaces of the power receiving coils 15 of the carts 10 arranged in a nested shape in a row on the storage plate 31 in a state where the respective power feeding surfaces are parallel to each other.

Next, it will be described how to store the cart 10 on the storage plate 31 of the cart storage system 20 according to the embodiment.

Figure 3:
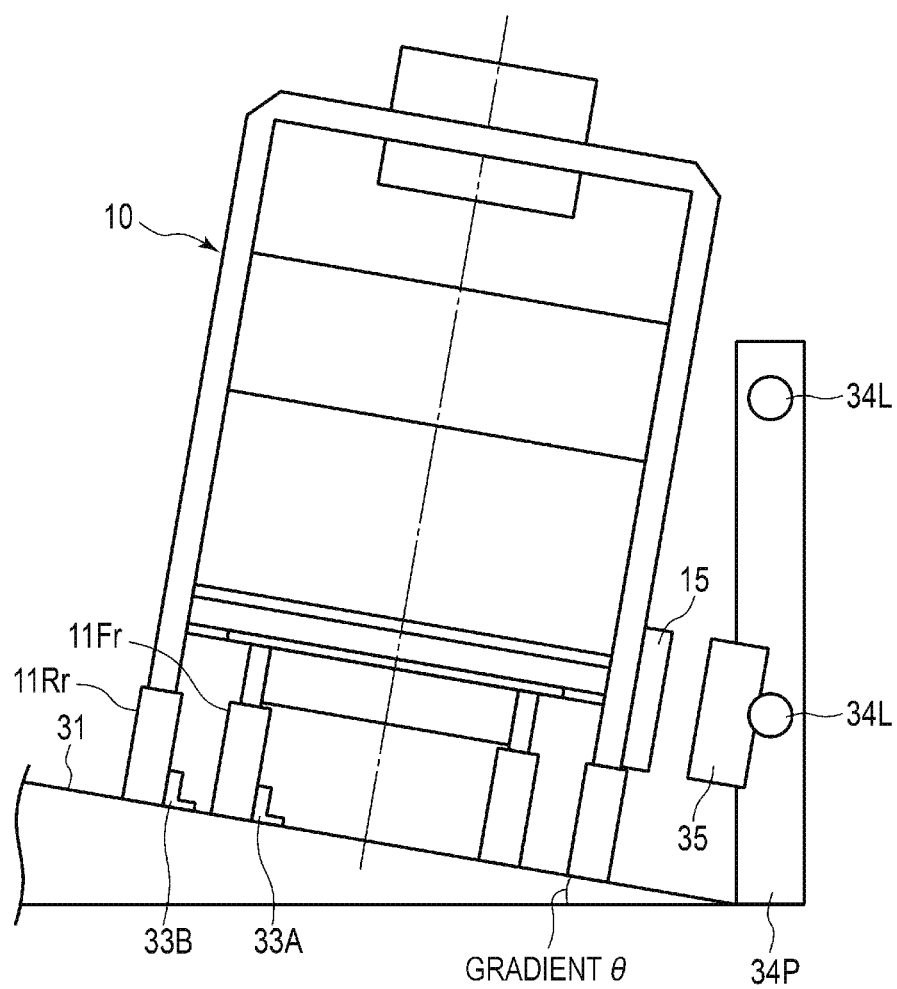
FIGS. 3 and 4 are each a diagram for explaining how the cart is stored in the cart storage system.

FIG. 3 is a diagram illustrating a state in which the cart 10 on the storage plate 31 of the cart storage system 20 according to the embodiment is viewed from the front side.

The cart operator grips the handle 14h of the cart 10 stored in the storage position, and pushes the cart 10 to move the cart 10 onto the running plate 30. After placing the cart 10 on the running plate 30, the operator moves the cart 10 on the running plate 30 to move the cart 10 onto the storage plate 31.

On the storage plate 31, the operator operates the cart 10 so that the right front wheel 11Fr is located between the front wheel holding plate 33A and the rear wheel holding plate 33B and the right rear wheel 11Rr is located on the right side of the rear wheel holding plate 33B. After moving the positions of the right front wheel 11Fr and rear wheel 11Rr to these positions, the operator pushes the cart 10 in the entering direction until the cart 10 hits the stopper 32. With this configuration, the right front wheel 11Fr of the cart 10 runs between the front wheel holding plate 33A and the rear wheel holding plate 33B and the right rear wheel 11Rr thereof runs on the right side of the rear wheel holding plate 33B.

As illustrated in FIG. 3, on the top surface of the storage plate 31, the right side is higher at an angle of the gradient θ with respect to the floor surface. For that reason, when the operator pushes the cart 10 in the entering direction, the cart 10 runs in the entering direction while leaning to the left side on the storage plate 31. As a result, the right front wheel 11Fr of the cart 10 runs along the right side of the front wheel holding plate 33A and the right rear wheel 11Rr thereof runs along the right side of the rear wheel holding plate 33B.

The front wheel 11Fr on the right side of the cart 10 moves in the entering direction while contacting the right side of the front wheel holding plate 33A. Alternatively, the front wheel 11Fr on the right side of the cart 10 moves to a position in contact with the right side of the front wheel holding plate 33A when the cart 10 released by the operator after hitting the stopper 32 moves to the left side. The rear wheel 11Rr on the right side of the cart 10 moves in the entering direction while contacting the right side of the rear wheel holding plate 33B. Alternatively, the rear wheel 11Rr on the right side of the cart 10 moves to a position in contact with the right side of the rear wheel holding plate 33B when the cart 10 released by the operator after hitting the stopper 32 moves to the left side.

With the behavior described above, the cart storage system 20 holds the front wheel 11Fr of the cart 10 on the right side of the front wheel holding plate 33A and holds the rear wheel 11Rr of the cart 10 on the right side of the rear wheel holding plate 33B. With this configuration, the cart storage system 20 can store the first cart 10 in a positional relationship as illustrated in FIG. 3. The position of the side surface of the cart 10 is maintained by the holding plate 33 in a state where the position of the cart 10 in the entering direction is positioned by the stopper 32. As a result, the power feeding surface of the power feeding coil 35 and the power receiving surface of the power receiving coil 15 provided on the cart 10 can be reliably aligned, and the interval between the power feeding surface and the power receiving surface can also be maintained at a predetermined distance.

Next, a case where a plurality of carts is stored in the cart storage system 20 according to the embodiment will be described.

Figure 4:
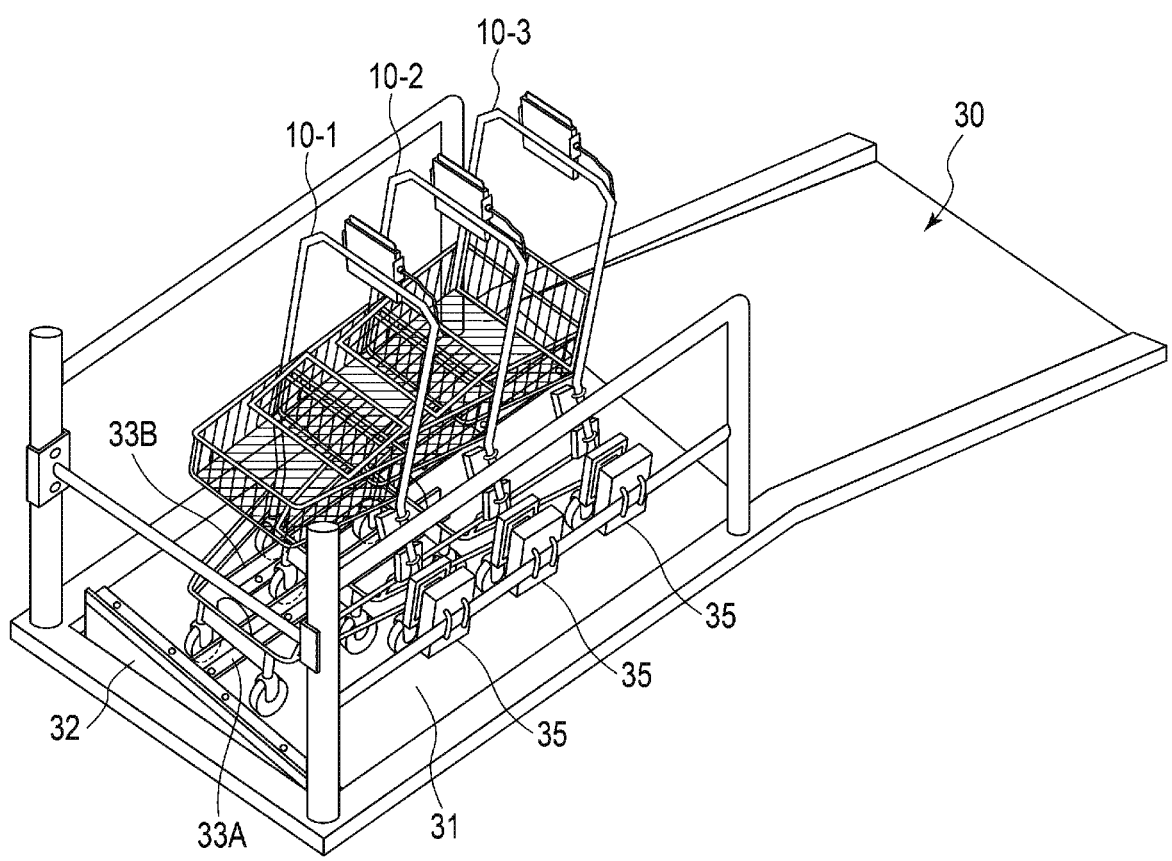

FIG. 4 is a diagram illustrating a state in which three carts 10 (10-1, 10-2, and 10-3) are stored in a nested shape in a row in the cart storage system 20 according to the embodiment.

The operator enters the first cart 10-1 from the entrance and exit of the running plate 30 and moves the first cart 10-1 on the running plate 30. In this case, the cart operator himself/herself gets on the running plate 30 to operate the cart 10-1. The running plate 30 is inclined up to the connection portion with the storage plate 31. For that reason, the operator pushes the handle 14h of the cart 10-1 to move the cart 10-1 to the storage plate 31.

The storage plate 31 is set with the gradient θ such that the left side thereof is inclined downward with respect to the entering direction a in front of the connection portion with the running plate 30. The operator runs the cart 10-1 so that the front wheel 11Fr on the right side of the cart 10-1 is located between the front wheel holding plate 33A and the rear wheel holding plate 33B, and the rear wheel 11Rr on the right side of the cart 10-1 is located on the right side of the rear wheel holding plate 33B. The operator moves the cart 10-1 on the storage plate 31 in the entering direction a until the front wheel 11Fr of the cart 10-1 reaches the position of the stopper 32.

When the front wheel 11Fr of the cart 10-1 reaches the position of the stopper 32, the operator releases the hand from the cart 10-1. When the operator releases the hand from the cart 10-1, the cart 10-1 moves to the left side (i.e., inclination direction b) on the storage plate 31 along the gradient θ by its own weight. The front wheel 11Fr on the right side of the cart 10-1 comes into contact with the right side of the front wheel holding plate 33A to stop moving to the left side, and is held at the position of the front wheel holding plate 33A. The rear wheel 11Rr on the right side of the cart 10-1 comes into contact with the right side of the rear wheel holding plate 33B to stop moving to the left side, and is held at the position of the rear wheel holding plate 33B.

Accordingly, the cart 10-1 stops at a predetermined position in the front-and-rear direction (i.e., entering direction a) because of the stopper 32 and stops at a predetermined position in the left-and-right direction because of the holding plate 33. As a result, the cart 10-1 can be reliably disposed at a position facing the power feeding coil 35 so that the power receiving surface of the power receiving coil 15 is parallel to the power feeding surface of the power feeding coil 35.

After the first cart 10-1 is stored at a predetermined position, the operator stores the second cart 10-2 behind the cart 10-1. The operator operates the second cart 10-2 in the same way as the cart 10-1 described above to move the second cart 10-2 onto the storage plate 31. On the storage plate 31, the operator moves the cart 10-2 so as to be stored in a nested shape in a row with respect to the previously stored cart 10-1. With this configuration, the cart 10-2 is stored in the cart 10-1 in a nested shape in a row.

In this case, the right front wheel 11Fr of the cart 10-2 is also held by the front wheel holding plate 33A and the right rear wheel 11Rr thereof is held by the rear wheel holding plate 33B. Accordingly, the cart 10-2 stops at a position in the front-and-rear direction because of the cart 10-1 and stops at the predetermined position in the left-right direction because of the holding plate 33 so as to be stored in a row. As a result, the cart 10-2 is disposed at a position facing the power feeding coil 35 so that the power receiving surface of the power receiving coil is parallel to the power feeding surface.

The third cart 10-3 is stored in a nested shape in a row behind the cart 10-2 by the operation of the operator, after the second cart 10-2 is stored behind the first cart 10-1. In this state, the right front wheel 11Fr of the cart 10-3 is also held by the front wheel holding plate 33A and the right rear wheel 11Rr is held by the rear wheel holding plate 33B. Accordingly, the cart 10-3 stops at a position in the front-and-rear direction (i.e., the entering direction a) because of the cart 10-2 and stops at the predetermined position in the left-and-right direction (i.e., the inclination direction b) because of the holding plate 33 so as to be stored in a nested shape in a row. As a result, the cart 10-3 is disposed at a position facing the power feeding coil 35 so that the power receiving surface of the power receiving coil is parallel to the power feeding surface. As described above, by storing a plurality of carts, each power receiving coil of each of the plurality of carts can be aligned with the power receiving surface of each power receiving coil parallel to the power feeding surface of each power feeding coil, thereby realizing excellent non-contact power feeding.

As described above, in the cart storage system according to the embodiment, the storage plate on which the cart to be stored is placed is installed with the gradient θ from a horizontal plane in a direction orthogonal to the entering direction of the cart. Furthermore, the cart storage system includes the stopper for maintaining the tip position of the cart stored at the head in the entering direction of the cart. With this configuration, in the power feed system, a plurality of carts can be aligned in a state where the power receiving surface of the power receiving coil provided in each cart is parallel to the power feeding surface of the corresponding power feeding coil.

In the cart storage system according to the embodiment, the holding plate 33 (i.e., the front wheel holding plate 33A and rear wheel holding plate 33B) for maintaining the position of the cart in the left-and-right direction is provided on the storage plate that is provided with a gradient. With this configuration, since the position in the left-and-right direction and orientation of the cart can be easily matched, the operator does not need complicated operations such as special positioning. For example, the operator can store the power receiving coil provided on the cart in a position where power can be supplied in a non-contact manner by simply pushing the cart lightly into the storage position as the cart storage place. According to the cart storage system, the power feeding coil and the power receiving coil can be aligned in a parallel positional relationship at a predetermined distance interval, and highly efficient non-contact power feeding can be realized.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A cart storage system for storing a movable cart, comprising:
   a storage plate inclined with respect to a floor in a lateral direction crossing a moving direction of a cart;
   a stopper along a back side of the storage plate in the moving direction; and
   a first holding plate extending along the moving direction, configured to stop movement of the cart in the lateral direction, and disposed a first predetermined distance away from a lower lateral side of the storage plate.

2. The system according to claim 1, further comprising:
   a second holding plate extending along the moving direction, configured to stop movement of the cart in the lateral direction, and disposed a second predetermined distance that is greater than the first predetermined distance away from the lower lateral side of the storage plate.

3. The system according to claim 2, wherein
   the first holding plate is positioned to restrict movement of a first wheel of the cart in the lateral direction and the second holding plate is positioned to restrict movement of a second wheel of the cart in the lateral direction.

4. The system according to claim 3, wherein
   the first wheel is a front wheel of the cart, and the second wheel is a rear wheel of the cart.

5. The system according to claim 2, wherein
each of the first and second holding plates has an L-shape when viewed along the moving direction of the cart.

6. The system according to claim 1, wherein
the storage plate is inclined so that the cart moves in the lateral direction by its own weight.

7. The system according to claim 6, wherein
the storage plate is inclined by 5 to 10 degrees.

8. The system according to claim 1, further comprising:
a running plate connected to the storage plate and inclined upwards as it approaches the storage plate.

9. The system according to claim 8, further comprising:
outer frames between which the running plate is arranged, the outer frames being configured to prevent wheels of the cart from rolling off the running plate.

10. The system according to claim 1, wherein
the stopper has an L-shape.

11. A power feed system for feeding power to one or more movable carts, comprising:
a storage plate inclined with respect to a floor in a lateral direction crossing a moving direction of a first cart;
a stopper along a back side of the storage plate in the moving direction;
a first holding plate extending along the moving direction, configured to stop movement of the cart in the first direction, and disposed a first predetermined distance away from a lower lateral side of the storage plate; and
a first power feeding circuit configured to feed power to the first cart held against the stopper and the holding plate.

12. The system according to claim 11, wherein
the first power feeding circuit includes a power feeding coil having a power feeding surface along the moving direction.

13. The system according to claim 12, wherein
the power feeding surface faces a power receiving surface of a power receiving circuit attached to the first cart.

14. The system according to claim 11, further comprising:
a second power feeding circuit configured to feed power to a second cart held against the first cart and the holding plate.

15. The system according to claim 14, wherein
the first and second power feeding circuit feed power to the first and second carts in a state where the first and second carts are stored on the storage plate.

16. The system according to claim 11, further comprises:
a second holding plate extending along the moving direction, configured to stop movement of the cart in the lateral direction, and disposed a second predetermined distance that is greater than the first predetermined distance away from the lower lateral side of the storage plate.

17. The system according to claim 16, wherein
the first holding plate is positioned to restrict movement of a first wheel of the cart in the lateral direction and the second holding plate is positioned to restrict movement of a second wheel of the cart in the lateral direction.

18. The system according to claim 17, wherein
the first wheel is a front wheel of the first cart, and the second wheel is a rear wheel of the first cart.

19. The system according to claim 17, wherein
each of the first and second holding plates has an L-shape when viewed along the moving direction of the cart.

20. The system according to claim 16, wherein
the storage plate is inclined so that the first cart moves in the lateral direction by its own weight.

* * * * *